United States Patent [19]
Arnold

[11] Patent Number: 5,244,083
[45] Date of Patent: Sep. 14, 1993

[54] FOLDED-EDGE BELT AND METHOD FOR MAKING SAME

[75] Inventor: Dale B. Arnold, Anthony, Kans.

[73] Assignee: Morrison Marketing Inc., Anthony, Kans.

[21] Appl. No.: 777,792

[22] Filed: Oct. 17, 1991

[51] Int. Cl.$^5$ .............................................. B65G 15/30
[52] U.S. Cl. .................................................. 198/844.2
[58] Field of Search .............. 198/847, 817, 844.2; 100/88; 56/341; 24/31 L

[56] References Cited

U.S. PATENT DOCUMENTS

| | | | |
|---|---|---|---|
| 676,565 | 6/1901 | Lindsay | 198/847 |
| 722,039 | 3/1903 | Plummer | 198/847 |
| 756,548 | 4/1904 | White | 198/847 |
| 975,560 | 11/1910 | Metzler | 198/847 |
| 1,698,035 | 1/1929 | Tobey | 198/847 |
| 1,781,750 | 11/1930 | Dodge et al. | 198/817 |
| 2,646,161 | 7/1953 | Lorig | 198/847 |
| 3,144,930 | 8/1964 | Michels | 198/847 |
| 4,034,617 | 7/1977 | Guyer | 198/844.2 |
| 4,371,580 | 2/1983 | Morrison et al. | 428/250 |

*Primary Examiner*—Joseph E. Valenza
*Attorney, Agent, or Firm*—White & Durkee Arnold

[57] ABSTRACT

Belts used in agricultural applications, and particularly belts used by hay balers for forming hay into bales, have a tendency to delaminated and crack along their cut longitudinal edges. The belt disclosed herein utilizes a folded fabric core surrounded by an appropriate elastomeric material to form an endless belt. The folded fabric core forms a folded edge along each longitudinal edge of the belt when the fabric core is folded twice to form a three-ply belt. These folded edges strengthened the longitudinal edges of the belt and provided a greater resistance to delamination and cracking.

11 Claims, 2 Drawing Sheets

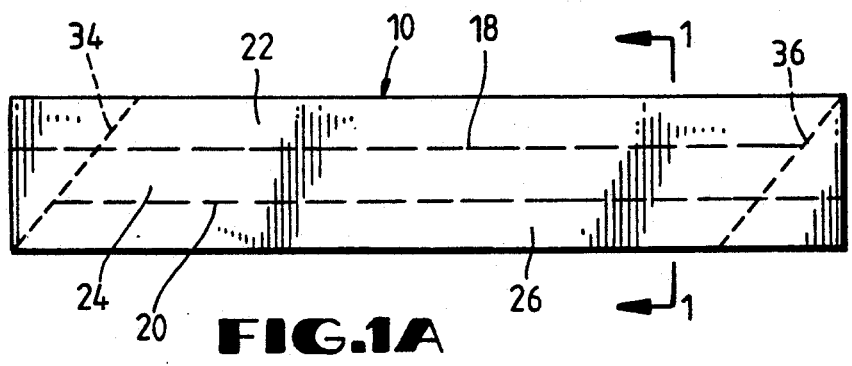 
FIG.1A  FIG.1B
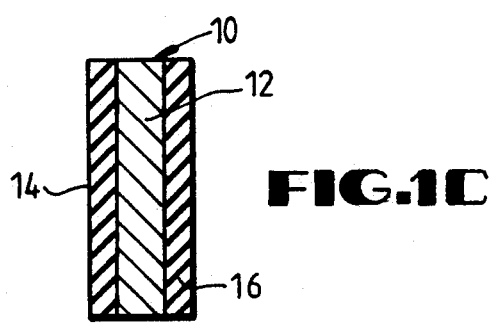
FIG.1C
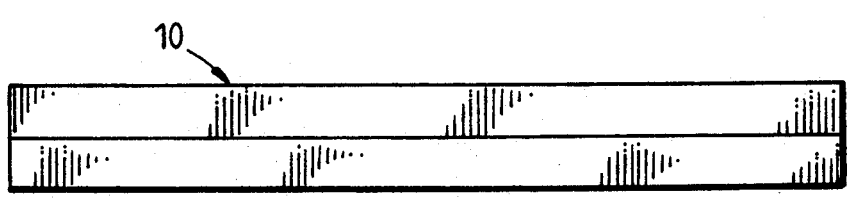 
FIG.2A  FIG.2B
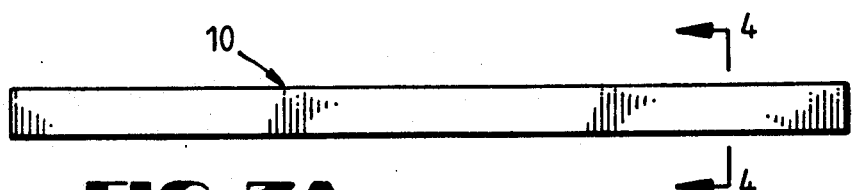
FIG.3A
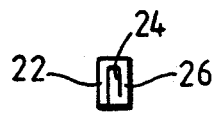 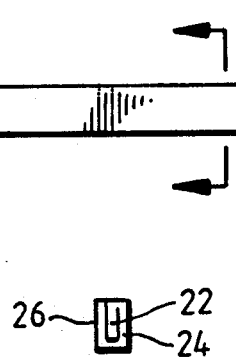
FIG.3B  FIG.3C

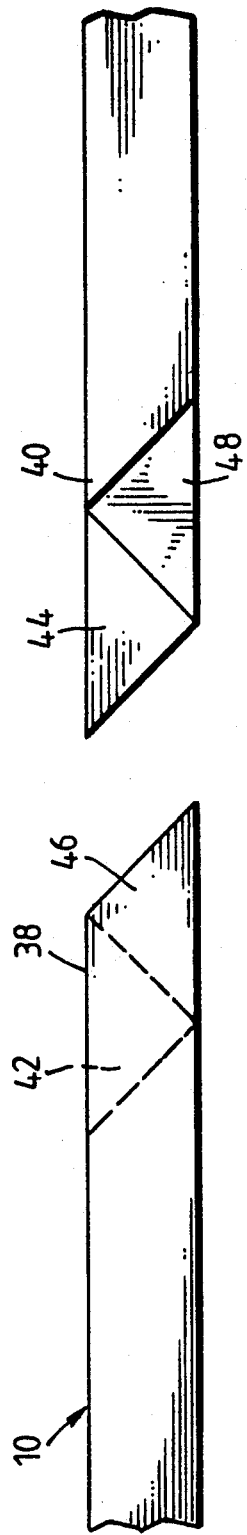
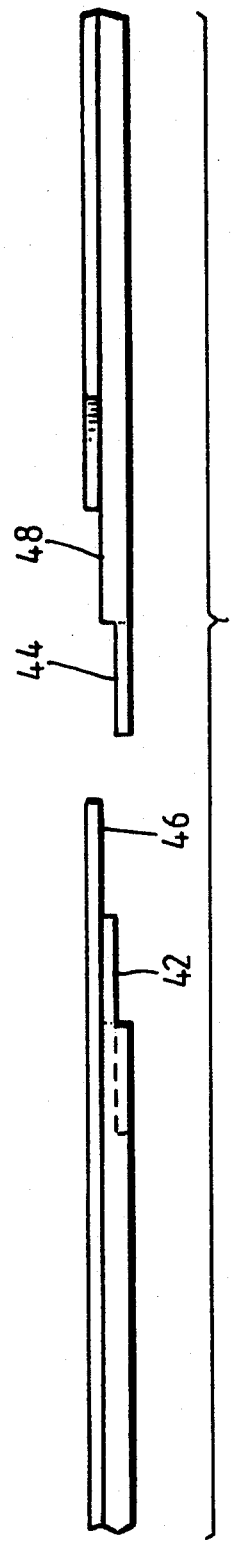
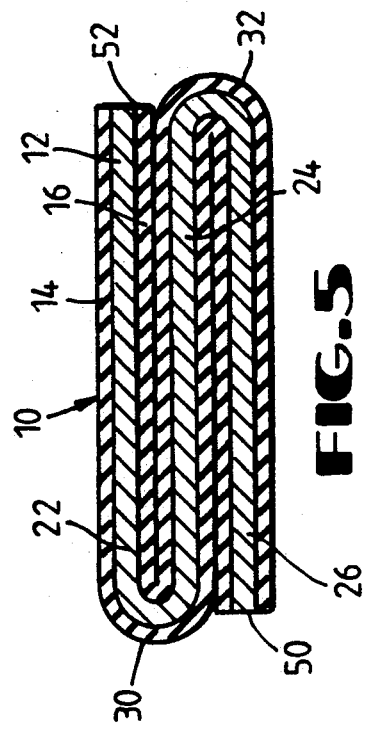
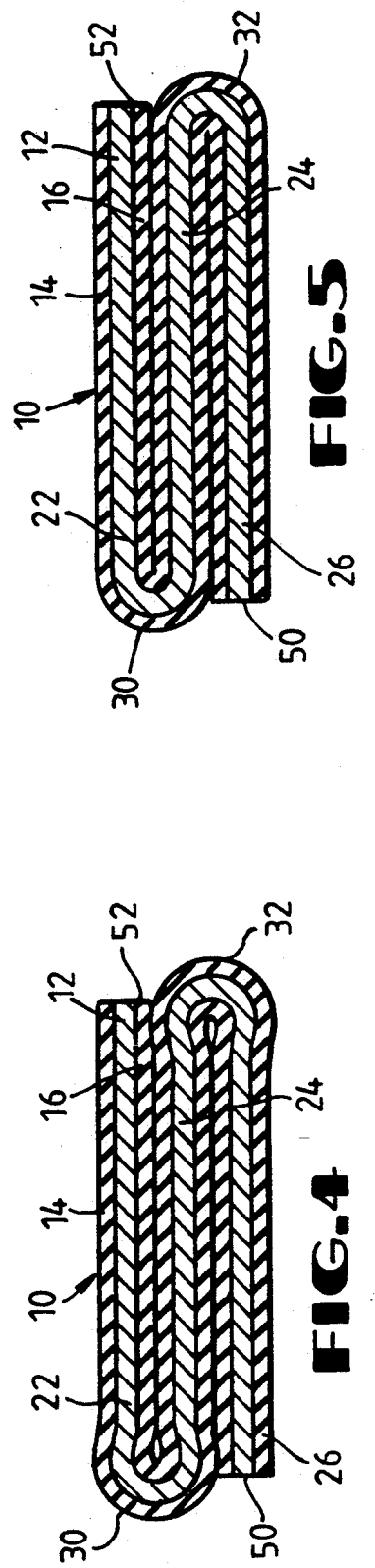

FOLDED-EDGE BELT AND METHOD FOR MAKING SAME

BACKGROUND OF THE INVENTION

1. Field of the Invention

The present invention relates generally to belting and, more particularly, to a belt useful in agricultural applications, such as in hay balers.

2. Description of the Related Art

In agricultural applications, belts are used for a wide variety of purposes, from transmitting power to conveying produce. Hay balers, for instance, use belts to form hay into a bale. Round hay balers use a conveyor belt that travels circumferentially to form a round hay bale. In a typical round hay baler, eight to fifteen rollers support four to eight individual belts, each of which are commonly about 40 feet long.

A round hay baler by have a variable chamber or a fixed chamber. The belts of a variable-chambered round hay baler form a chamber into which hay is fed. The belts compress the hay to form a round hay bale. The belts of a fixed-chamber round hay baler also form an open chamber into which hay is deposited. However, in contrast to variable-chambered round hay balers, the belts do not compress the hay to form a bale. Rather, hay must fill the fixed-chamber in order to form an adequate bale.

Hay balers commonly use cut-edge belts. Mechanical fasteners join the ends of each belt to form an endless belt that is capable of traveling around the rollers in the hay baler. A commonly used mechanical fastener, known as a "clipper lace" splice, is described in U.S. Pat. No. 4,371,580, issued to Morrison, et al. on Feb. 1, 1983. A clipper lace splice includes a plurality of metal eyelets that are connected to each end of the belt. When the eyelets on each end of the belt are aligned with one another, a rod or other suitable retaining material is passed through the eyelets. The ends of the rod are suitably formed to prevent removal of the rod so that the splice remains intact.

Several factors determine the longevity of a belt so constructed. First, the belts are subjected to heavy loads as they travel around the rollers when baling These loads cause the belts to stretch and, thus, fatigue. Second, the belts are subjected to a substantial amount of flexing when travelling around the rollers. Oftentimes, some of the rollers are positioned such that the belts must travel in an S-shape during operation. This flexing typically produces cracks between the plies of a multi-ply belt. Third, the mechanical fasteners tend to wear and fail at a faster rate along the longitudinal edges of the belts. If the mechanical fastener fails, the belt must be replaced before the hay baler can continue operating. Fourth, the edges of the belt tend to curl up against the mechanical guides on the rollers. This curling induces an even greater amount of stress and flexion at the edges of the belt and, thus, contributes to accelerated fatigue in this area of the belt.

While belts have been improved over the years to minimize or overcome various problems, no known belt satisfactorily minimizes or overcomes the problems mentioned above. Two-ply belts, where the plies are made of a polyamide fabric, such as nylon, exhibit excellent flexing characteristics, but also possess a relatively high modulus. In an effort to solve the elongation problem, a two-ply belt was developed where the plies were made of a rayon material. Rayon has a lower modulus than a polyamide fabric and, hence, does not stretch as much as a polyamide belt under the same load. However, the rayon belt proved to be unacceptable, since rayon is particularly susceptible to environmental deterioration caused by moisture. In another attempt to solve the elongation problem, a two-ply belt was developed where the plies were made of a polyester material. This belt proved ineffective since the polyester plies tended to crack when flexed, and the cracking was most pronounced in the area of the mechanical fastener.

A subsequently developed three-ply belt exhibited improved flexing and stretching characteristics as compared with the above-mentioned two-ply belts The center ply was a polyester fabric, and each outer ply was a polyamide fabric. Interposed between the center ply and each outer ply was a rubber skim. These materials were bonded together, and a rubber cover was bonded to each outer ply to provide abrasion protection for the belt and to give the machinery on which the belt was used a surface to engage when the belt was in operation.

However, all of the above-described belts use mechanical fasteners to form an endless belt. Moreover, each of these multi-ply belts tend to delaminate, particularly near the edges of the belt. These problems may continue to plague those skilled in the art due to the method by which such belts are manufactured. Taking the above-described three-ply belt as an example, a brief discussion of conventional manufacturing techniques is in order. First, the fabric of the center ply and the fabrics of the outer plies are primed with Resorcinol Formaldehyde Latex (RFL). The uncured rubber skims and rubber covers are then interposed between the fabric sheets. The stacked sheets are vulcanized to form the appropriate bonds, and the belts are then cut to the appropriate lengths and widths from the three-ply sheet.

The longitudinal edges of the belts produced by this cutting method tend to delaminate when the belts are subjected to the loads and stresses of a hay baling operation. The delamination along the longitudinal edges also contributes to fastener wear near the edges. Moreover, this manufacturing technique produces at least a modicum of waste since some of the material cut from the sheets is thrown away.

The present invention is directed to overcoming, or at least minimizing, one or more of the problems faced by the industry, such as the problems set forth above.

SUMMARY OF THE INVENTION

In accordance with one aspect of the present invention, there is provided a method for making a multi-ply belt for use in hay baling. The method includes the step of coating a fabric sheet with an elastomeric material to form a coated fabric sheet. The coated fabric sheet is folded onto itself a predetermined number of times along preselected imaginary lines to form a multi-ply belt. The elastomeric material is cured and the multi-ply belt is formed into an endless belt.

In accordance with another aspect of the present invention, the endless belt is formed by forming the ends of the coated fabric sheet at a predetermined angle with respect to the imaginary lines, so that the folding forms complimentary end portions on the multi-ply belt. Thus, the complimentary end portions may be joined together to form a multi-ply splice.

In accordance with yet another aspect of the present invention, there is provided a folded-edge belt. The belt includes a one-piece fabric core having at least one folded edge forming a longitudinal edge of the belt and defining a plurality of fabric plies. An elastomeric material is disposed between each of the plurality of plies.

BRIEF DESCRIPTION OF THE DRAWINGS

The foregoing and other advantages of the invention will become apparent upon reading the following detailed description and upon reference to the drawings in which:

FIG. 1A is a top view of an unfolded belt in accordance with the present invention;

FIG. 1B is a side view of the belt illustrated in FIG. 1A;

FIG. 1C is an enlarged, detailed cross-sectional illustration of the belt of FIG. 1A taken along line 1—1;

FIG. 2A is a top view of the belt illustrated in FIG. 1A after having been folded once;

FIG. 2B is a side view of the belt illustrated in FIG. 2A;

FIG. 3A is a top view of the belt illustrated in FIG. 1A after having been folded twice;

FIG. 3B is a side view of the belt illustrated in FIG. 3A;

FIG. 3C is an alternative side view of the belt illustrated in FIG. 3A;

FIG. 4 is an enlarged, detailed cross-sectional illustration of the belt of FIG. 3A taken along line 4—4;

FIG. 5 illustrates the cross-section of the belt illustrated in FIG. 4 after being exposed to a curing process;

FIG. 6A is a top view of two ends of a belt folded in accordance with the present invention; and FIG. 6B is a bottom view of the two ends of the belt illustrated in FIG. 4A.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives following within the spirit and scope of the invention as defined by the appended claims.

DESCRIPTION OF THE PREFERRED EMBODIMENTS

Turning now to the drawings and referring initially to FIGS. 1A, 1B, and 1C, an unfolded belt is illustrated and generally designated by a reference numeral 10. The belt 10 includes a base sheet or core 12. The core 12 of the belt 10 is preferably a reinforcing fabric sheet. For example, the fabric may be made from cotton, polyester, rayon, polyethylene, polyamides, such as kevlar or nylon, or any suitable combination thereof.

The fabric core 12 is typically a woven sheet that exhibits a square weave or a triaxial weave. In a square weave, the longitudinal fibers of the fabric core 12 are at an angle of 90° with respect to the transverse fibers of the fabric core 12. In a triaxial weave, on the other hand, the longitudinal fibers of the fabric core 12 are at an angle of less than, or greater than, 90° with respect to the transverse fibers of the fabric core 12. In the preferred embodiment, the fabric core 12 exhibits a square weave where polyester fibers extend longitudinally along the length of the core 12 and where nylon fibers extend transversely. The longitudinal polyester fibers make the fabric core 12 strong and resistant to stretching, while the transverse nylon fibers allow the fabric core 12 to flex without cracking.

The fabric core 12 is usually treated with an adhesion promoter, such as Resourcenol Formaldehyde Latex (RFL). While adhesion promoters are typically used to provide a primary chemical adhesion between different plies of a multi-ply belt, it will become apparent during the subsequent discussion that the adhesion promoter may promote adhesion between one portion of the belt 10 and another portion of the belt 10 when it is folded.

After the fabric core 12 has been treated with an adhesion promoter, the fabric core 12 is coated with a polymeric or elastomeric material on each side thereof. The coating material is illustrated in FIG. 1C as layers designated by reference numerals 14 and 16. The preferred coating material is styrenebutadiene rubber, commonly referred to as synthetic rubber. However, other coating materials, such as viapreme, polybutadiene, or natural rubber, could be used to form the layers 14 and 16.

The coating material may be applied in a variety of ways. Preferably, a sheet of the coating material is extruded onto each side of the fabric core 12. The extrusion process involves running the fabric core 12 through a pressure point and forcing the heated coating material into and completely around the fabric core 12. Alternatively, layers 14 and 16 of the coating material could be applied to the fabric core 12 using a calendering process. Basically, the calendering process includes sandwiching the fabric core 12 between the layers 14 and 16 of coating material, and, then, curing the coating material. If the coating material is a thermal fed polymer or rubber, a vulcanization process will cure the coating material. The vulcanization process typically involves heating the coating material to a preselected temperature for a preselected length of time, as is well known in the art. However, if the coating material belongs to another group of polymers, such as thermoplastics, only a catalyzation or hardening process is required to cure the material. This process may include heating the material up to a preselected temperature and then immediately cooling it using a squelching process.

In contrast to the extrusion and calendering processes which increase the overall gauge of the belt 10, a frictioning process may be used to apply the coating material to the fabric core 12. Using the frictioning process, a very small amount of coating material is wiped onto the surfaces of the fabric core 12. Frictioning rarely increases the overall gauge of the fabric core 12 by any appreciable amount. Therefore, since the coating material adds strength and resilience to the belt 10, the extrusion or calendaring processes are preferred.

Once the coating material 14 and 16 has been applied to the fabric core 12, the one-ply belt 10 is folded to form a multi-ply belt, as illustrated in FIG. 3A. In other words, the belt illustrated in FIG. 1A is a one-ply belt that will be transformed into a multi-ply belt using a folding process. The following discussion will describe a folding process where the belt 10 is folded twice to form a three-ply belt, but it should be understood that a belt having fewer or more plies could be formed using this type of folding process. However, in this case, if a 7-inch wide belt is desired for use on a hay baler, the width of the belt 10 illustrated in FIG. 1A would be about 21 inches.

The dashed lines 18 and 20 in FIG. 1A designate the locations of the two folds. As illustrated in FIG. 2A, one longitudinal edge portion 22 of the belt 10 is folded onto a central portion 24 of the belt 10. FIGS. 3A and 3B illustrate the belt 10 after the other longitudinal edge portion 26 is folded onto the central portion 24 to form an S-shaped fold. Alternatively, as illustrated in FIG. 3C, the longitudinal edge portion 26 may be folded onto the longitudinal edge portion 22 to form a G-shaped fold.

Preferably, the folding process is performed before the coating material has been cured by vulcanization or by another appropriate process. If the layers 14 and 16 of coating material are rubber, for instance, and the rubber has been extruded onto the fabric core 12, the belt 10 is advantageously folded into a three-ply arrangement While the rubber is still hot from the extrusion process. The rubber, being hot, has a great tendency to stick to itself when folded. However, even if the belt 10 was not folded into the three-ply arrangement until the rubber coating material was cool, raw rubber has a certain tackiness to it, so it would probably stick together even when cool.

Taking the above example, after the rubber-coated belt 10 has been folded to form a three-ply belt, it is placed into a fixed mold or into a rotary mold (not shown) where the rubber is cured. In a fixed mold, the belt 10 would be cured a section at a time, assuming that the belt 10 is longer than the mold. When one section is cured, the mold is opened and the belt 10 is advanced so that the next section may be cured. Using the rotary mold, on the other hand, the belt 10 may be continuously cured as the belt 10 circumnavigates the rotary mold. The speed at which the belt 10 travels through the rotary mold is controlled so that the rubber coating material along the entire length of the belt 10 is properly vulcanized.

Regardless of what type of mold is used to cure the rubber, it should be understood that the heat applied by the mold allows the rubber to flow into and around the multiple plies of the folded belt 10 to produce a belt having a uniform cross section. This result of the vulcanization process may be readily visualized by referring to FIGS. 4 and 5. FIG. 4, which may be thought of as an enlarged, detailed view of FIG. 3B, illustrates a cross-sectional are of an S-shaped folded belt 10. The belt 10 illustrated in FIG. 4 has been folded but has not been subjected to the vulcanization process described above. It should be noticed that the two-ply areas near the folded edges 30 and 32 appear to be somewhat higher than the two-ply areas formed between the portions 22 and 24 or the portions 24 and 26 near the center of the belt 10. Since the layers 14 and 16 of the coating material are applied in a uniform width on each side of the fabric core 12, the coating material tends to "bunch up" on the radially inner portions of the folded edges 30 and 32, resulting in the increased thickness at the longitudinal edges of the belt 10.

FIG. 5 illustrates the belt 10 of FIG. 4 after it has undergone the vulcanization process. In FIG. 5 it should be noticed that the areas of the belt 10 near the folded edges 30 and 32 are no longer thicker than the more centralized portions of the belt 10. The heat applied to the belt 10 during the vulcanization process causes the rubber coating material to flow into area of the mold cavity that have the least pressure differential. Thus, since the pressure of the coating material in the radially inner edges of the folds 30 and 32 is at a relatively high pressure, the rubber coating material flows from these areas to areas of lower pressure, such as areas within the fabric core 12 or more centralized areas of the belt 10. As a result of the vulcanization process, the belt 10 emerges with a crosssection having substantially the same thickness from one longitudinal edge to the other.

Before, during, or after the curing process, the belt 10 may be cut to its desired length, and prepared for endless fastening. Preferably, before the belt 10 is folded, the ends of the belt 10 are cut at 45° angles as illustrated by the dashed lines 34 and 36 in FIG. 1A. Once the belt 10 has been folded into the S-shaped configuration, the opposing ends of the belt 10 resemble the end portions 38 and 40 illustrated in FIGS. 6A and 6B. As can be seen, when the belt 10 is cut and folded in this manner, the end portions 38 and 40 complement one another in that they fit together almost perfectly to form a substantially uninterrupted endless three-ply belt. When the end portions 38 and 40 are joined, the triangular area 42 is coupled to the complementary triangular area 44, and the triangular area 46 is coupled to the complementary triangular area 48.

The end portions 38 and 40 may be joined together in a variety of ways. First, the end portions 38 and 40 could be joined together after a cushioned gum stock or a bonding gum rubber has been placed between them. Either of these materials would serve as an adhesive that would melt and hold the ends 38 and 40 of the belt 10 together as a result of the curing or vulcanization process. These materials may be applied to the coating material on the triangular portions 42, 44, 46, and 48, or the coating material could be scraped off and replaced by these materials. Second, the end portions 38 and 40 of the belt 10 could be sewn together in preparation for bonding during the normal vulcanization or curing process. Third, the end portions 38 and 40 could be bonded together after the curing process, using a cold bonding agent, such as rubber contact cement which is available from a number of vendors including CRP of Germany. Fourth, the end portions 38 and 40 could be joined using appropriate mechanical fasteners.

It has been found that this folding process reinforces the longitudinal edges of the belt 10 by eliminating the cut edges found in previous belts. The longitudinal edges of the folded-edge belt 10 do not tend to delaminate nearly as quickly as the cut edges because (1) the folded edges have a folded portion of the fabric core 12 holding the two plies together, and (2) the edge portions 50 and 52 at the longitudinal edges of the belt 10, which are not reinforced by a fabric fold, have not been weakened by a cutting process. Furthermore, the folded-edge belt 10 produces little waste since the belt 10 is not formed using a longitudinal cutting operation.

It has been found that the folded, reinforced longitudinal edges of the folded-edge belt 10 increases the tensile breaking strength of the longitudinal edges by a minimum factor of three as compared with a similar belt having cut longitudinal edges. It has also been found that the transverse stiffness of the folded-edge belt 10 is also increased, so that the folded-edge belt 10 offers better resistance to edge curling. Moreover, the folded-edge belt 10 has a much higher modulus than cut-edge belt manufactured with the same materials. A higher modulus means a lower amount of stretch under a given load condition.

I claim:
1. A folded-edge belt comprising:

a one-piece fabric core having at least one folded edge forming a longitudinal edge of said belt and defining a plurality of a fabric plies;

elastomeric material being disposed between and separating each of said plurality of plies; and said belt having overlapping abutting ends adapted for engagement therebetween, each of said ends comprised of multiple level connection areas wherein adjacent connection areas on said ends are on different levels and oppositely angled relative to said longitudinal edge of said belt.

2. The belt, as set forth in claim 1, wherein said fabric core is made from a material selected from the group consisting of cotton, polyester, rayon, polyethylene, and polyamide, or any combination thereof.

3. The belt, as set forth in claim 1, wherein said elastomeric material is selected from the group consisting of styrenebutadiene rubber, viapreme, polybutadiene, and natural rubber.

4. The belt, as set forth in claim 1, wherein said fabric core comprises:

a fabric sheet having a square weave pattern, said square weave pattern being defined by a first plurality of fibers extending longitudinally along said belt and a second plurality of fibers extending orthogonally with respect to said first plurality of fibers.

5. The belt, as set forth in claim 4, wherein said first plurality of fibers are polyester and said second plurality of fibers are nylon.

6. The belt, as set forth in claim 1, wherein said fabric core comprises:

a fabric sheet having a triaxial weave pattern, said triaxial weave pattern being defined by a first plurality of fibers extending longitudinally along said belt and a second plurality of fibers extending obliquely with respect to said first plurality of fibers.

7. A belt as recited in claim 1, wherein said connection areas are triangularly shaped.

8. A belt as recited in claim 7, wherein said belt has a longitudinal centerline and at least one of said connection areas is defined by a line that is disposed at an angle of approximately forty-five degrees to the longitudinal centerline of said belt.

9. A belt as recited in claim 1 further comprising fabric stitching disposed through each of said overlapping abutting ends.

10. A belt as recited in claim 1 further comprising metallic staples disposed through each of said overlapping abutting ends.

11. A belt as recited in claim 1 further comprising rivets disposed through each of said overlapping abutting ends.

* * * * *